(12) United States Patent
Wu et al.

(10) Patent No.: US 12,214,877 B2
(45) Date of Patent: Feb. 4, 2025

(54) AUTONOMOUS DRONE

(71) Applicant: PSJ INTERNATIONAL LTD., Tortola (VG)

(72) Inventors: Ruey-Beei Wu, Taipei (TW); Yu-Er Chen, Taichung (TW)

(73) Assignee: PSJ INTERNATIONAL LTD., Tortola (VG)

( * ) Notice: Subject to any disclaimer, the term of this patent is extended or adjusted under 35 U.S.C. 154(b) by 307 days.

(21) Appl. No.: 17/878,035

(22) Filed: Jul. 31, 2022

(65) Prior Publication Data
US 2023/0264814 A1    Aug. 24, 2023

(51) Int. Cl.
*B64C 39/02*    (2023.01)

(52) U.S. Cl.
CPC ........ *B64C 39/024* (2013.01); *B64U 2201/10* (2023.01); *B64U 2201/20* (2023.01)

(58) Field of Classification Search
CPC ... B64C 39/024; B64C 39/02; B64U 2201/10; B64U 2201/20; G05D 1/0016
See application file for complete search history.

(56) References Cited

U.S. PATENT DOCUMENTS

| | | | |
|---|---|---|---|
| 9,873,408 B2* | 1/2018 | Capizzo | G05D 1/12 |
| 2016/0107531 A1* | 4/2016 | Ge | H02J 7/345 |
| | | | 320/166 |
| 2018/0068567 A1* | 3/2018 | Gong | G08G 5/0052 |
| 2018/0120832 A1* | 5/2018 | Hintze | G06Q 50/40 |
| 2018/0173220 A1 | 6/2018 | Wang et al. | |
| 2019/0174149 A1* | 6/2019 | Zhang | H04N 7/181 |
| 2019/0278897 A1* | 9/2019 | Zhang | G07C 5/008 |
| 2020/0073385 A1 | 3/2020 | Jobanputra et al. | |
| 2020/0097027 A1 | 3/2020 | Su et al. | |
| 2021/0061466 A1* | 3/2021 | Gee | H04N 21/2347 |

FOREIGN PATENT DOCUMENTS

| | | | |
|---|---|---|---|
| CN | 108089590 A | 5/2018 | |
| CN | 110692027 A | 1/2020 | |
| CN | 113110564 A | 7/2021 | |
| WO | WO-2016154945 A1 * | 10/2016 | ........... B64C 39/024 |

* cited by examiner

*Primary Examiner* — Yonel Beaulieu
(74) *Attorney, Agent, or Firm* — Li & Cai Intellectual Property Office

(57) ABSTRACT

An autonomous drone is provided. When a remote control circuit of a remote controller is triggered to output a remote control signal, a main controller of a drone records the remote control signal and a flight control panel of the drone controls the drone to fly according to the remote control signal. When the remote controller is triggered to output an automatic flight signal, a signal receiver of the drone receives and transmits the automatic flight signal to the main controller. At this time, the main controller instructs the flight control panel to control the drone to fly according to movement instruction messages of the remote control signal previously recorded.

7 Claims, 5 Drawing Sheets

AUTONOMOUS DRONE

CROSS-REFERENCE TO RELATED PATENT APPLICATION

This application claims the benefit of priority to Taiwan Patent Application No. 111106680, filed on Feb. 24, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a drone, and more particularly to an autonomous drone.

BACKGROUND OF THE DISCLOSURE

With the rapid diversification of drone applications, more and more drones can be seen flying through the air, whether to deliver consumer goods for our daily lives or to engage in tasks otherwise assigned. However, since the drones cannot carry heavy items, most of the drones can only carry items having a total weight within a range of three to five kilograms at once. Therefore, when a large number of items need to be delivered at the same time, lots of drones must be deployed to respectively deliver the number of items to a destination. At this time, if the drones are capable of automatically flying and delivering the items to the destination without requiring users to control the drones by remote controllers, especially for long distance deliveries, not only can manpower be effectively saved, but a flight efficiency and safety of the drone can also be improved.

SUMMARY OF THE DISCLOSURE

In response to the above-referenced technical inadequacies, the present disclosure provides an autonomous drone. The autonomous drone includes a remote controller and a drone. The remote controller includes a remote control circuit and a signal transmitter. The signal transmitter is electrically connected to the remote control circuit. A plurality of movement trigger components and a flight mode trigger component are disposed on the remote controller and adjacent to the remote control circuit. The remote control circuit is triggered to generate a remote control signal in response to each of the movement trigger components being pressed. The remote control circuit is triggered to generate an automatic flight signal in response to the flight mode trigger component being pressed. The signal transmitter outputs the remote control signal and the automatic flight signal. The drone includes a drone body, a signal receiver and a flight control panel. The signal receiver is disposed on the drone body and wirelessly connected to the signal transmitter. The signal receiver is configured to receive and transmit the remote control signal and the automatic flight signal from the signal transmitter. The main controller is disposed inside the drone body and connected to the signal receiver. The main controller includes a main control component configured to receive, record and transmit the remote control signal from the signal receiver. After the main control component receives the automatic flight signal from the signal receiver, the main control component uses a movement instruction message instructed by the remote control signal previously received as historical flight reference data, and outputs a main control flight signal according to the historical flight reference data. The flight control panel is disposed inside the drone body. The flight control panel is connected to the drone body and the main controller. The flight control panel is configured to control the drone to fly according to the remote control signal from the main controller. When the flight control panel receives the main control flight signal, the flight control panel controls the drone to fly in a previous flying manner according to the main control flight signal.

In certain embodiments, a following trigger component is disposed on the remote controller. The remote controller includes a first positioner. The first positioner is connected to the remote control circuit. The drone includes a second positioner. The second positioner is connected to the main controller and wirelessly connected to the first positioner. When the remote control circuit is triggered to output a following instruction signal in response to the following trigger component being pressed, the first positioner outputs a first positioning signal according to the following instruction signal. The second positioner outputs a second positioning signal according to the first positioning signal. The main controller instructs the flight control panel to control the drone to fly according to the second positioning signal.

In certain embodiments, the drone further includes a radar transmitter and a radar receiver. The radar transmitter and the radar receiver are disposed on the drone body and connected to the main controller. The radar transmitter emits a detection signal. The detection signal is reflected by an object to form a reflected signal. The radar receiver receives the reflected signal from the object and transmits the reflected signal to the main controller. The main controller determines a distance between the drone and the object to output a main control detected signal according to the detection signal and the reflected signal. The flight control panel controls the drone to fly according to the main control detected signal.

In certain embodiments, the main controller further includes an inverter and a signal processing component. The inverter is connected to the flight control panel, the signal processing component and the signal receiver. The inverter transmits the remote control signal from the signal processing receiver to the signal processing component. When the flight mode trigger component is not triggered, the signal processing component transmits the remote control signal back to the inverter and to the main control component at the same time. Then, the inverter transmits the remote control signal to the flight control panel, and the main controller records the remote control signal as the historical flight reference data.

In certain embodiments, the signal processing component outputs a processing signal to the flight control panel according to messages and sources of the remote control signal and the main control flight signal. The flight control panel controls the drone to fly according to the processing signal.

In certain embodiments, the inverter is configured to convert the remote control signal or the main control flight signal from a high logic level to a low logic level or from the low logic level to the high logic level.

In certain embodiments, the drone further includes a sensor. The sensor is disposed on the drone body and connected to the main control component. The sensor is configured to sense status data of the drone or a surrounding environment of the drone to output a sensed signal. The main controller outputs a main control sensed signal according to the sensed signal. The flight control panel controls the drone to fly according to the main control sensed signal.

As described above, the present disclosure provides the autonomous drone. After a user stops using the remote controller to control the drone, the autonomous drone of the present disclosure can continue to automatically fly in the previous flying manner or follow the user holding the remote controller in real time. Therefore, the user does not need to use the remote controller to control the drone at all times, thereby saving time and effort for the user.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
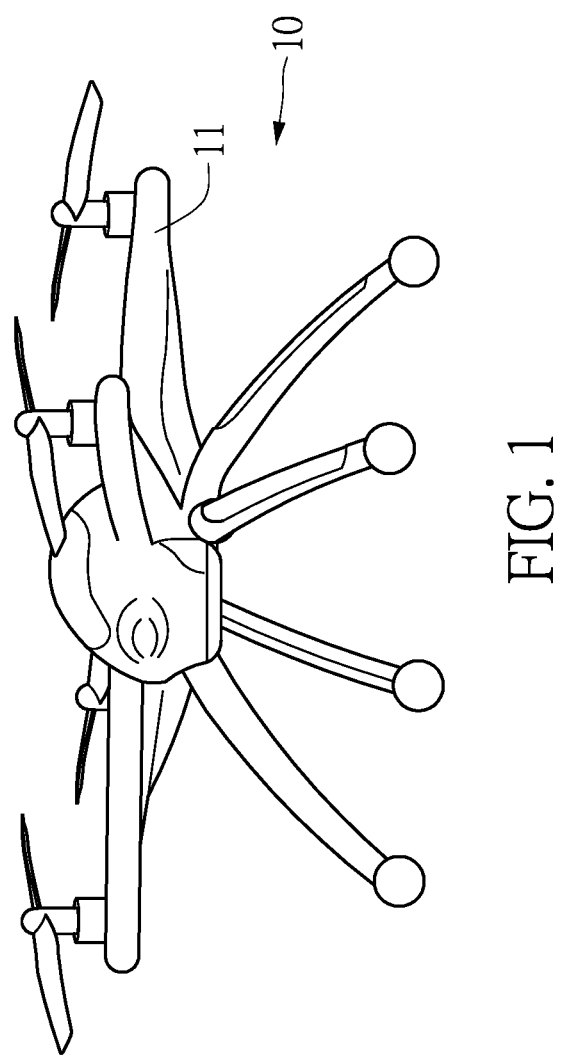
FIG. 1 is a schematic diagram of an autonomous drone according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 4:
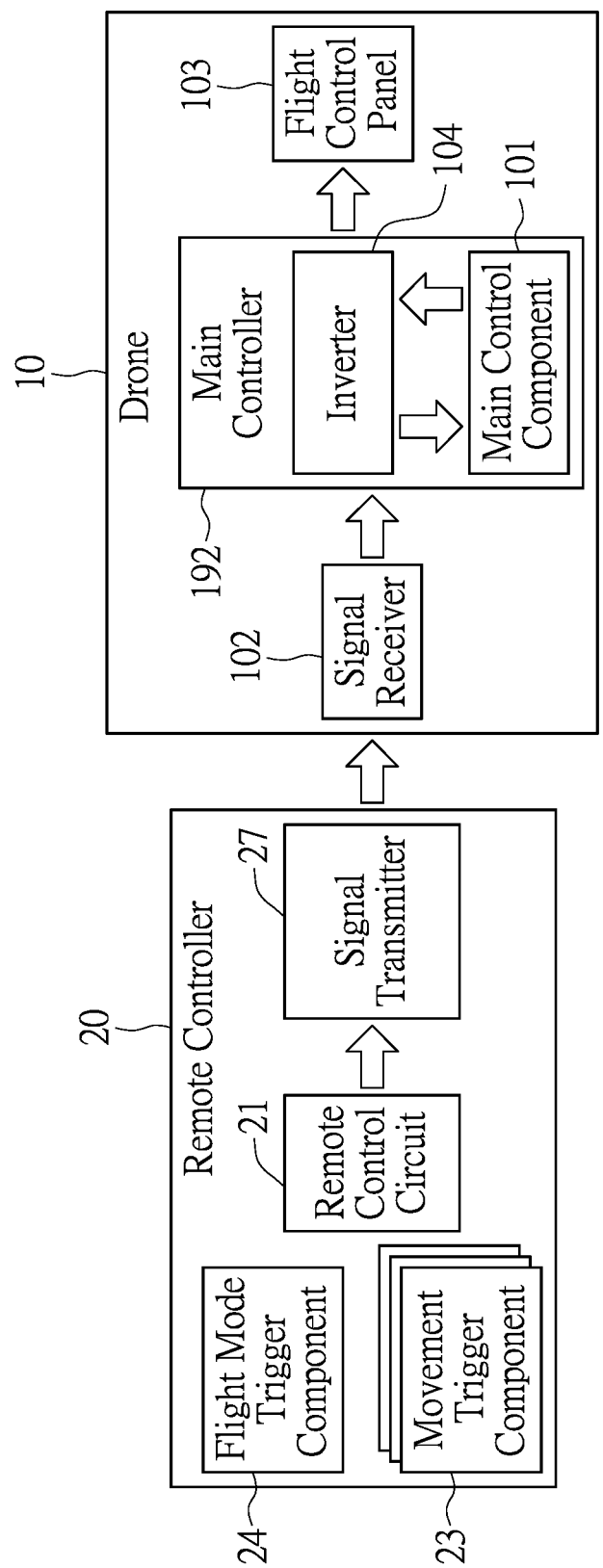
FIG. 4 is a block diagram of the autonomous drone according to the first embodiment of the present disclosure.

Reference is made to FIGS. 1 and 4, in which FIG. 1 is a schematic diagram of an autonomous drone according to a first embodiment of the present disclosure, and FIG. 4 is a block diagram of the autonomous drone according to the first embodiment of the present disclosure.

The autonomous drone of the embodiment of the present disclosure may include a drone 10 and a remote controller 20.

As shown in FIG. 1, a drone body 11 of the drone 10 may include a body shell, landing gears, propellers, and so on. It should be understood that, the present disclosure is not limited to the type of the drone 10 as shown in FIG. 1. As shown in FIG. 4, a signal receiver 102, a flight control panel 103, and in particular a main controller 192 are disposed inside the drone body 11 of the drone 10.

As shown in FIG. 4, the remote controller 20 may include a remote control circuit 21 and a signal transmitter 27. The signal transmitter 27 of the remote controller 20 may be electrically connected to the remote control circuit 21 of the remote controller 20. The signal transmitter 27 of the remote controller 20 may be wirelessly connected to the signal receiver 102 of the drone 10.

A plurality of trigger components may be disposed on the remote controller 20 and adjacent to the remote control circuit 21. The plurality of trigger components on the remote controller 20 may include a plurality of movement trigger components 23 that respectively correspond to a plurality of movement directions such as an upward direction, a downward direction, a left direction and a right direction. In practice, other trigger components that respectively correspond to different movement manners (such as flipping) may also be disposed on the remote controller 20. The trigger components may be switches, buttons or other types of components, but the present disclosure is not limited thereto.

First, a user holds the remote controller 20 and presses the movement trigger components 23 on the remote controller 20. For example, the user may switch the buttons or the switches from closed positions to open positions. When the user presses any one of the movement trigger components 23, the remote control circuit 21 is electrically connected to or contacted with the one of the movement trigger components 23 and is triggered to generate a remote control signal corresponding to the one of the movement trigger components 23 that is pressed. Then, the signal transmitter 27 of the remote controller 20 emits the remote control signal.

When the signal receiver 102 of the drone 10 wirelessly receives the remote control signal from the signal transmitter 27 of the remote controller 20, the signal receiver 102 directly transmits the remote control signal to circuit components of the flight control panel 103, or the signal receiver 102 transmits the remote control signal to the circuit components of the flight control panel 103 through the main controller 192. Finally, the circuit components of the flight control panel 103 remotely control the drone 10 to fly according to the remote control signal of the remote controller 20.

It should be understood that, when the user sequentially presses some or all of the plurality of movement trigger components 23 on the remote controller 20, the remote controller 20 sequentially outputs the remote control signals that respectively correspond to the movement trigger components 23 being pressed. The remote controller 20 remotely controls the drone 10 to fly sequentially in the different movement directions or in the different movement manners that are indicated by the remote control signals.

It is worth noting that the main controller 192 is disposed inside the drone body 11 of the drone 10. After the user uses the remote controller 20 to control the drone 10 to fly once, the main controller 192 of the drone 10 can automatically control the drone 10 to continue flying without requiring the user to manually control the drone 10 using the remote controller 20. The main controller 192 may be connected to the signal receiver 102 and the circuit components of the flight control panel 103.

The main controller 192 of the drone 10 may include a main control component 101. After the remote control circuit 21 of the remote controller 20 is triggered to output the remote control signal by the user, the main control component 101 of the drone 10 may transmit the remote control signal to the circuit components of the flight control panel 103, and may process and record messages and data of the remote control signal. The data recorded by the main control component 101 may include the movement instruction message indicated by the remote control signal previously received as historical flight reference data. Multiple pieces of the historical flight reference data may be arranged in a sequence that the movement trigger components 23 are triggered by the user.

If necessary, the main controller 192 of the drone 10 may further include an inverter 104. The inverter 104 may be connected to the signal receiver 102, a signal processing component and the circuit components of the flight control panel 103. The inverter 104 of the main controller 192 may receive the remote control signal of the remote controller 20 from the signal receiver 102, and may convert the remote control signal from a high logic level to a low logic level or from the low logic level to the high logic level. Alternatively, the inverter 104 of the main controller 192 may receive an automatic flight signal from the signal processing component, and may convert the automatic flight signal from the high logic level to the low logic level or from the low logic level to the high logic level. The inverter 104 of the main controller 192 may output the converted remote control signal to the circuit components of the flight control panel 103 or the main control component 101, or may output the converted automatic flight signal to the main control component 101.

It is worth noting that a flight mode trigger component 24 may be disposed on the remote controller 20. When the user triggers the flight mode trigger component 24, the drone 10 enters a specified flight mode such as an automatic flight mode. In the automatic flight mode, the drone 10 flies in a previous flight manner. The flight mode trigger component 24 may be a switch or a button, but the present disclosure is not limited thereto.

When the user presses the flight mode trigger component 24 of the remote controller 20, the remote control circuit 21 of the remote controller 20 is electrically connected to or electrically contacted with the flight mode trigger component 24 and is triggered to generate the automatic flight signal. The signal transmitter 27 of the remote controller 20 emits the automatic flight signal to the drone 10. The automatic flight signal instructs the drone 10 to enter the automatic flight mode.

When the signal receiver 102 of the drone 10 receives the automatic flight signal from the signal transmitter 27 of the remote controller 20, the signal receiver 102 transmits the automatic flight signal to the main controller 192 of the drone 10. When the main control component 101 of the main controller 192 of the drone 10 receives the automatic flight signal from the signal receiver 102 (though the inverter 104), the main control component 101 determines that the drone 10 enters the automatic flight mode.

In the automatic flight mode, the main controller 192 of the drone 10 outputs a main control flight signal to the circuit components of the flight control panel 103 through the inverter 104, according to (directions of) the movement instruction message indicated by the remote control signal that is previously received and recorded as the historical flight reference data. The circuit components of the flight control panel 103 controls the drone 10 to fly according to the main control flight signal. At this time, the drone 10 automatically continues to fly in the previous flight manner without requiring the user to control the drone 10 using the remote controller 20. This allows the user to rest without having to focus on controlling the drone 10.

That is, after the user uses the remote controller 20 to control the drone to fly for a short distance and presses the flight mode trigger component 24, the drone 10 can continue to fly in the previous flight manner even if the user stops inputting commands via the remote controller 20.

Figure 2:
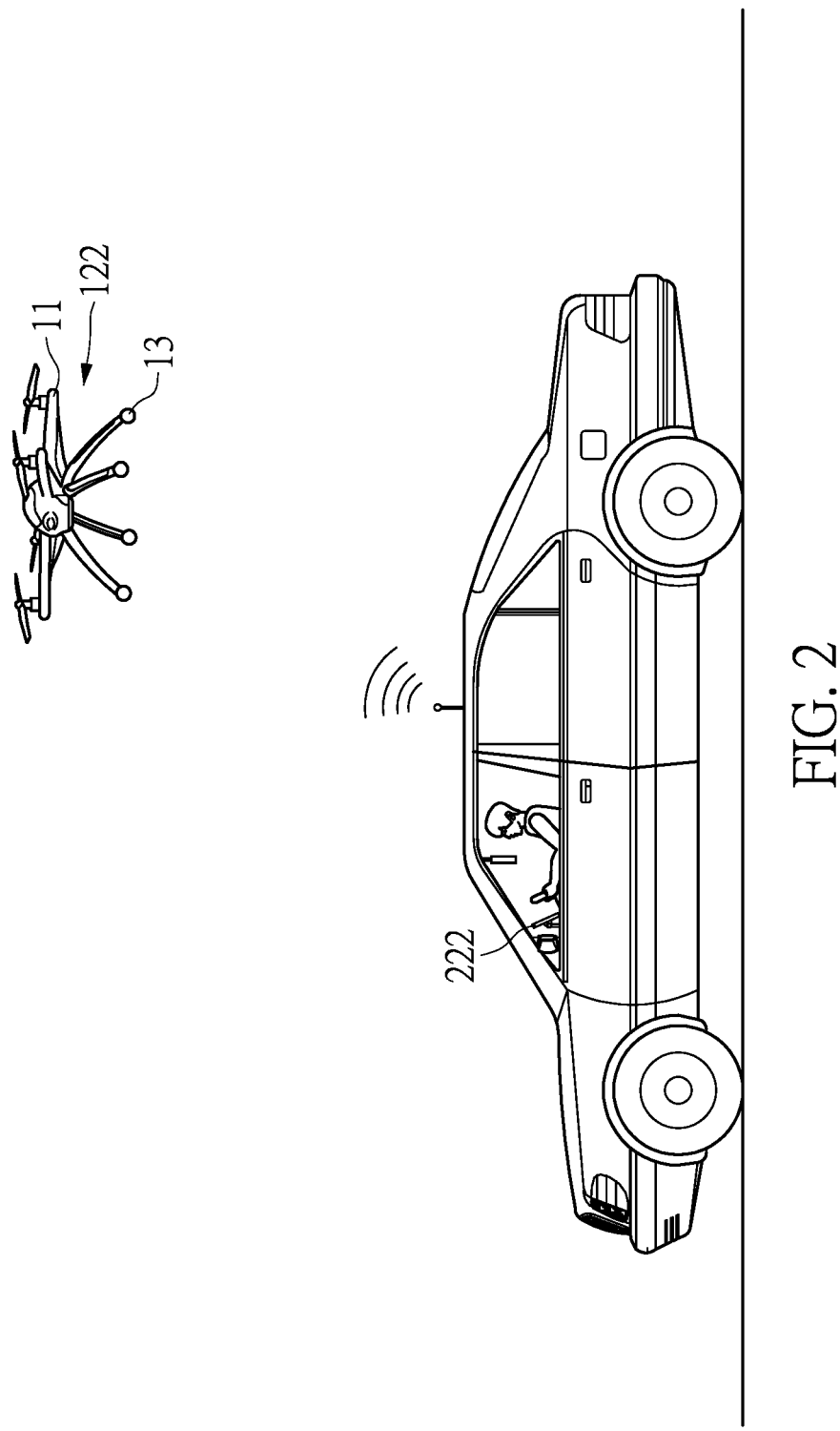
FIG. 2 is a schematic diagram of the autonomous drone following a user holding a remote controller automatically according to a second embodiment of the present disclosure.
Figure 3:
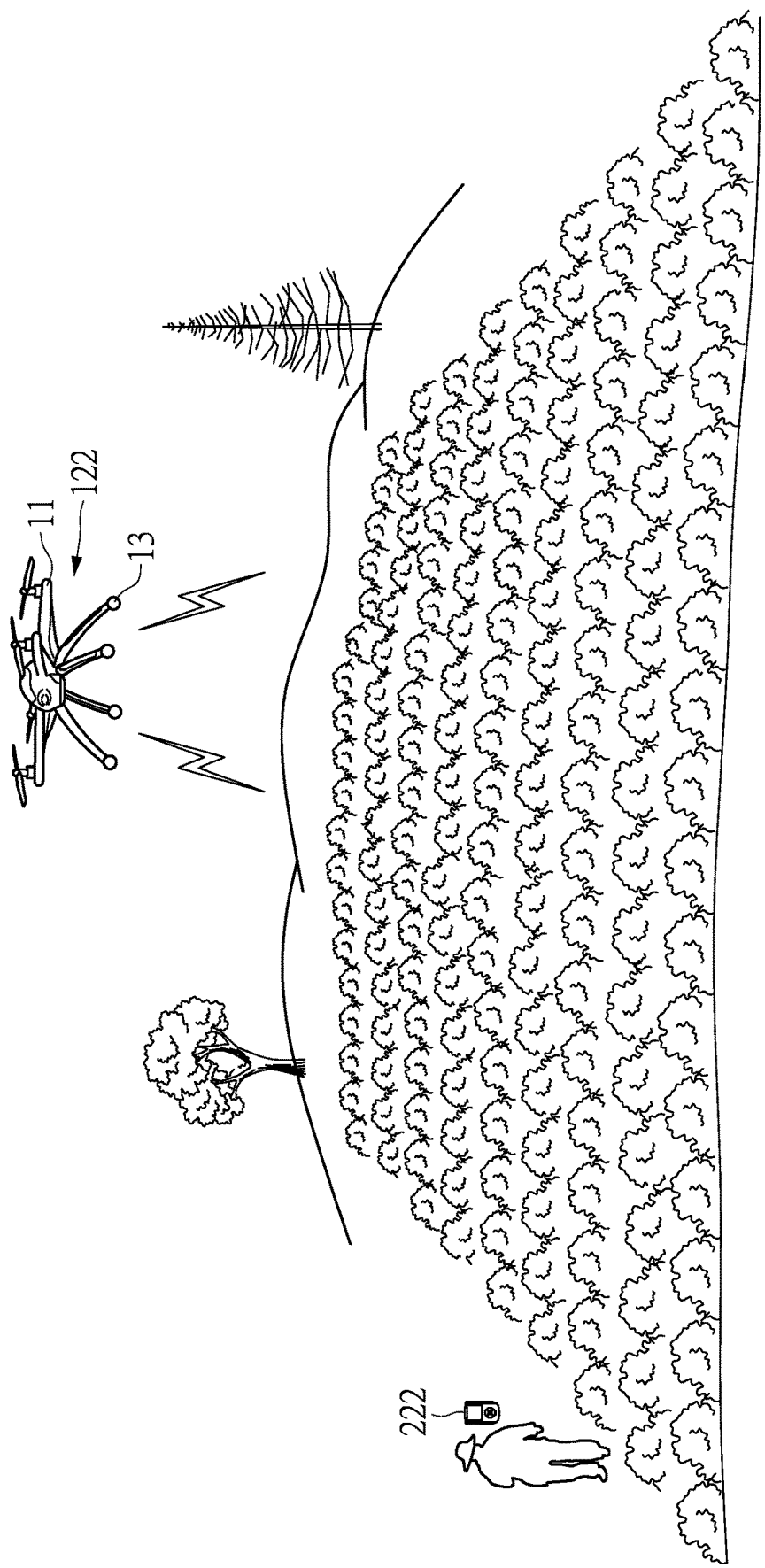
FIG. 3 is a schematic diagram of the autonomous drone detecting a height position of the autonomous drone relative to a hillside where a tea garden is located according to the second embodiment of the present disclosure.
Figure 5:
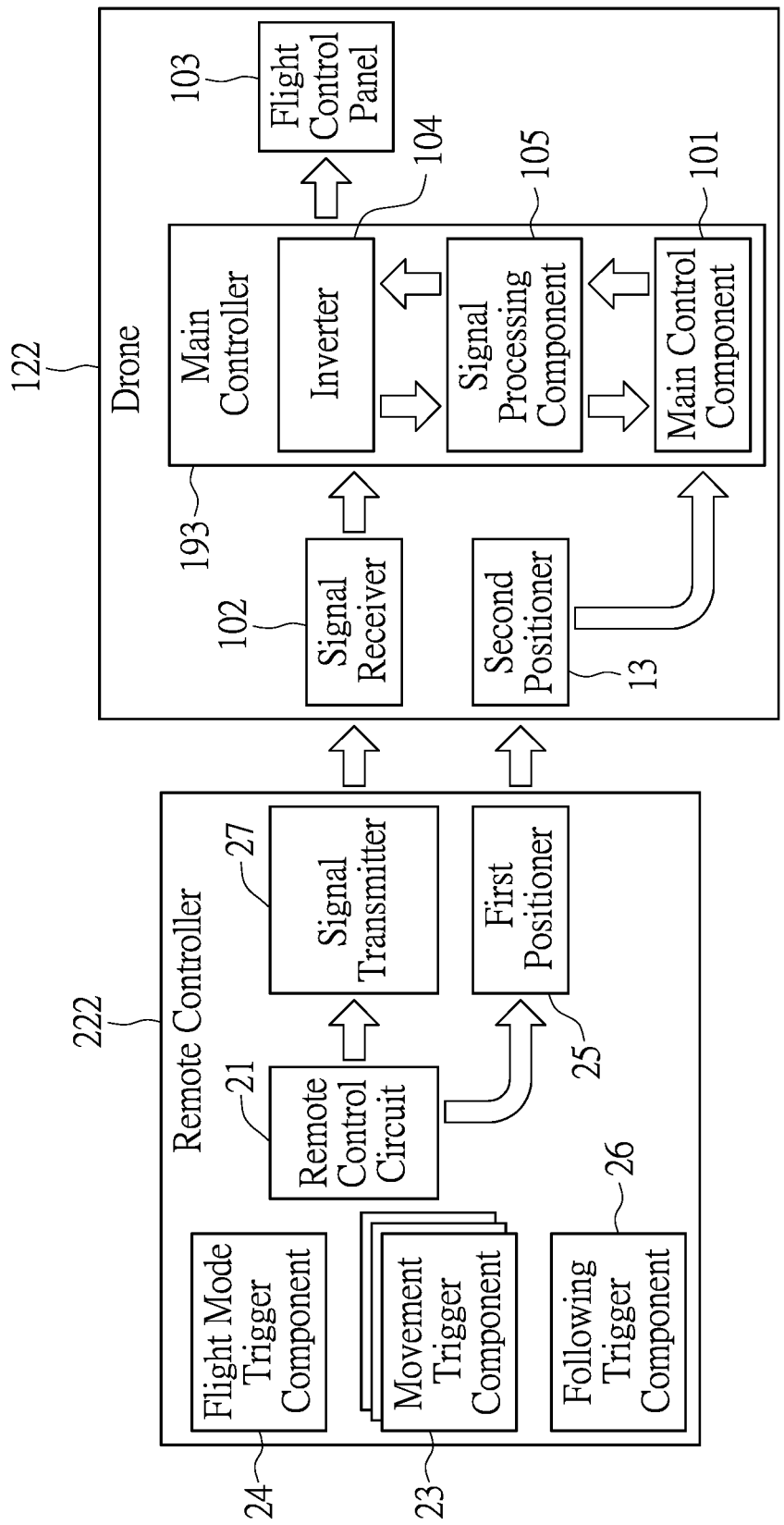
FIG. 5 is a block diagram of the autonomous drone according to the second embodiment of the present disclosure.

Reference is made to FIGS. 2, 3 and 5, in which FIG. 2 is a schematic diagram of the autonomous drone following a user holding a remote controller automatically according to a second embodiment of the present disclosure, FIG. 3 is a schematic diagram of the autonomous drone detecting a height position of the autonomous drone relative to a hillside where a tea garden is located according to the second embodiment of the present disclosure, and FIG. 5 is a block diagram of the autonomous drone according to the second embodiment of the present disclosure.

The autonomous drone of the embodiment of the present disclosure can be used on various occasions. For example, as shown in FIG. 2, a drone 122 automatically flies and follows the user holding a remote controller 222. The drone 122 may automatically follow the user as described above, or the drone 122 may automatically position itself to realize an automatic following (i.e., trailing) function as described in the following. As shown in FIG. 5, the drone 122 may include a second positioner 13, a main controller 193, the signal receiver 102 and the flight control panel 103.

In the embodiment, in order to more effectively realize the automatic following function of the drone 122, the remote controller 222 not only includes the remote control circuit 21 and the signal transmitter 27, but also includes a first positioner 25. In addition, a following trigger component 26 is disposed on the remote controller 222. The following trigger component 26 may be a switch or a button, but the present disclosure is not limited thereto. In practice, the flight mode trigger component 24 as described above may be replaced with the following trigger component 26 by which the drone 122 enters an automatic following mode.

The second positioner 13 of the drone 122 may be wirelessly connected to the first positioner 25 of the remote controller 222 through a wireless transmission component of the drone 122 or other transmission components such as antennas. In practice, the second positioner 13 and the first positioner 25 may be connected to each other though the signal transmitter 27 and the signal receiver 102.

When the user presses the following trigger component 26 of the remote controller 222, the remote control circuit 21 of the remote controller 222 is triggered to output a following instruction signal to the first positioner 25. The first positioner 25 outputs a first positioning signal according to the following instruction signal. Then, the second positioner 13 outputs a second positioning signal according to the first positioning signal. The main control component 101 of the main controller 193 outputs the main control flight signal to the flight control panel 103 sequentially through the signal processing component 105 and the inverter 104. The flight control panel 103 controls the drone 122 to fly according to the main control flight signal.

For example, the first positioner 25 of the remote controller 222 emits the first positioning signal (such as a radar signal), and then the second positioner 13 may determine a position of the drone 122 relative to the remote controller 222 according to a strength of the first positioning signal or a time between a time point at which the remote controller 222 emits the first positioning signal and a time point at which the second positioner 13 receives the first positioning signal.

Alternatively, the first positioning signal that is outputted to the drone 122 from the remote controller 222 may directly include a coordinate position of the remote controller 222. The main control component 101 of the main controller 193 of the drone 122 may calculate a distance between the drone 122 and the second positioner 13, according to the coordinate position of the remote controller 222 that is indicated by the first positioning signal and a coordinate position of the drone 122 that is indicated by the second positioning signal.

In practice, the drone 122 may not only position itself (relative to the remote controller 222), but also detect a distance between the drone 122 and the ground (e.g., of a hillside of a tea garden where alpine tea is grown) as shown in FIG. 3, and fly higher or lower according to the detected distance. When the drone 122 flies to an appropriate height position, a sprayer on the drone 122 can, e.g., properly spray water, fertilizer and so forth on the tea garden.

A plurality of detecting components 13 may be disposed at an edge or other positions of the drone body 11 of the drone 10 as shown in FIG. 2. The detecting components 13 may be used to detect distances between different parts of the drone 122 and the ground or other objects (such as obstacles).

For example, each of the detecting components 13 of the drone 122 may include a radar transmitter and a radar receiver, but the present disclosure is not limited thereto. In practice, the radar transmitter may be replaced with an optical sensor or different types of sensors, and the radar receiver may be replaced with an optical receiver.

The radar transmitter and the radar receiver may be disposed on the drone body 11 of the drone 122 and connected to the main control component 101 of the main controller 193. The radar transmitter may emit a detection signal (such as, but not limited to, a radar signal). After a period of time has elapsed, the detection signal is reflected by the ground or other objects to form a reflected signal. The radar receiver may receive the reflected signal and then transmit the reflected signal to the main control component 101 of the main controller 193.

The main control component 101 of the main controller 193 may calculate a strength difference between a strength of the detection signal and a strength of the reflected signal, or calculate a time difference between a time point at which the radar transmitter emits the detection signal and a time point at which the radar receiver receives the reflected signal. The main control component 101 may determine the distance between the drone 122 and the ground or the other objects to output a main control detected signal according to the strength difference or the time difference. The flight control panel 103 may control and adjust a flight path of the drone 122 (such that the drone 122 can avoid obstacles during flight) according to the main control detected signal.

During an automatic flight of the drone 122, the user may use the remote controller 222 to control the drone 122 to fly along different paths. Under this condition, the flight control panel 103 of the drone 122 must be capable of determining sources of the signals, for example, from the remote controller 222 or the main controller 193 of the drone 122. Therefore, in this embodiment, the main controller 193 may further include the signal processing component 105. The signal processing component 105 determines which one of the main control detected signal and the remote control signal is preferentially used to control the drone 122 to fly according to a priority order of the main controller 193 and the remote controller 222 of the drone 122.

When the signal processing component 105 only receives the remote control signal of the remote controller 222 from the inverter 104 and the flight mode trigger component 24 is not triggered, the signal processing component 105 may directly transmit the remote control signal back to the inverter 104, and then the inverter 104 transmits the remote control signal to the flight control panel 103 and notifies the flight control panel 103 of the source of the remote control signal. At the same time, the signal processing component 105 transmits the remote control signal to the main control component 101. The main control component 101 records an arrangement and a combination of the directions of the movement instruction messages of the remote control signal as the historical flight reference data.

When the signal processing component 105 only receives the main control flight signal or the main control detected signal from the main control component 101 of the main controller 193 of the drone 122, the signal processing component 105 may transmit the main control flight signal or the main control detected signal, as well as the source thereof, to the flight control panel 103 through the inverter 104.

When the signal processing component 105 receives the remote control signal of the remote controller 222 and receives the main control flight signal or the main control detected signal of the main control component 101 at the same time, the signal processing component 105 may combine them to output a processing signal to the flight control panel 103 through the inverter 104. The flight control panel 103 may control the drone 122 to fly according to the processing signal.

If necessary, the signal processing component 105 may have a signal format converting function. The signal processing component 105 may be configured to convert the remote control signal, the main control flight signal or the main control detected signal from an analog format to a digital format or from the digital format to the analog format.

If necessary, the autonomous drone of the embodiment of the present disclosure may further include one or more sensors (such as, but not limited to, inertial sensors, gravity sensors, triaxial acceleration sensors, etc.) that may be disposed on the drone body 11 of the drone 122. The sensors may be connected to the main control component 101. The sensors may be configured to sense status data of the drone 122 to output a sensing signal to the main control component 101. The main control component 101 may output a main control sensed signal according to the sensing signal of the sensors. The flight control panel 103 may control the drone 122 to fly according to the main control sensed signal.

If necessary, the main control component 101 of the autonomous drone of the embodiment of the present disclosure may be wirelessly connected to other electronic devices such as computers (through the signal receiver 102), and may output other main control signals to the flight control panel 103 according to signals from the other electronic devices. The flight control panel 103 may fly according to the other main control signals from the main control component 101.

In conclusion, the present disclosure provides the autonomous drone. After the user stops using the remote controller to control the drone, the autonomous drone of the present disclosure can continue to automatically fly in the previous flying manner or follow the user holding the remote controller in real time. Therefore, the user does not need to use the remote controller to control the drone at all times, thereby saving time and effort for the user.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An autonomous drone, which is applicable to a remote controller including a remote control circuit and a signal transmitter, wherein the signal transmitter is electrically connected to the remote control circuit, a plurality of movement trigger components and a flight mode trigger component are disposed on the remote controller and adjacent to the remote control circuit, the remote control circuit is triggered to generate a remote control signal in response to each of the movement trigger components being pressed, the remote control circuit is triggered to generate an automatic flight signal in response to the flight mode trigger component being pressed, and the signal transmitter outputs the remote control signal and the automatic flight signal, the autonomous drone comprising:
   a drone body;
   a signal receiver disposed on the drone body and wirelessly connected to the signal transmitter, and configured to receive and transmit the remote control signal and the automatic flight signal from the signal transmitter;
a main controller disposed inside the drone body and connected to the signal receiver, wherein the main controller includes a main control component configured to receive, record and transmit the remote control signal from the signal receiver, and after the main control component receives the automatic flight signal from the signal receiver, the main control component uses a movement instruction message instructed by the remote control signal previously received as historical flight reference data, and outputs a main control flight signal according to the historical flight reference data; and
   a flight control panel disposed inside the drone body, wherein the flight control panel is connected to the drone body and the main controller, the flight control panel is configured to control the drone body to fly according to the remote control signal from the main controller, and when the flight control panel receives the main control flight signal, the flight control panel controls the drone body to fly in a previous flying manner according to the main control flight signal.

2. The autonomous drone according to claim 1, wherein a following trigger component is disposed on the remote controller, the remote controller includes a first positioner connected to the remote control circuit, and the autonomous drone further includes a second positioner that is connected to the main controller and wirelessly connected to the first positioner;
   wherein, when the remote control circuit is triggered to output a following instruction signal in response to the following trigger component being pressed, the first positioner outputs a first positioning signal according to the following instruction signal, the second positioner outputs a second positioning signal according to the first positioning signal, and the main controller instructs the flight control panel to control the drone body to fly according to the second positioning signal.

3. The autonomous drone according to claim 1, wherein the autonomous drone further includes a radar transmitter and a radar receiver, the radar transmitter and the radar receiver are disposed on the drone body and connected to the main controller, the radar transmitter emits a detection signal, the detection signal is reflected by an object to form a reflected signal, the radar receiver receives the reflected signal from the object and transmits the reflected signal to the main controller, the main controller determines a distance between the autonomous drone and the object to output a main control detected signal according to the detection signal and the reflected signal, and the flight control panel controls the drone body to fly according to the main control detected signal.

4. The autonomous drone according to claim 1, wherein the main controller further includes an inverter and a signal processing component, the inverter is connected to the flight control panel, the signal processing component and the signal receiver, and the inverter transmits the remote control signal from the signal processing receiver to the signal processing component;
   wherein, when the flight mode trigger component is not triggered, the signal processing component transmits the remote control signal back to the inverter and to the main control component at the same time, and then the inverter transmits the remote control signal to the flight control panel and the main controller records the remote control signal as the historical flight reference data.

5. The autonomous drone according to claim 4, wherein the signal processing component outputs a processing signal to the flight control panel according to messages and sources of the remote control signal and the main control flight signal, and the flight control panel controls the drone body to fly according to the processing signal.

6. The autonomous drone according to claim 4, wherein the inverter is configured to convert the remote control signal or the main control flight signal from a high logic level to a low logic level or from the low logic level to the high logic level.

7. The autonomous drone according to claim 1, wherein the autonomous drone further includes a sensor that is disposed on the drone body and connected to the main control component, the sensor is configured to sense status data of the autonomous drone or a surrounding environment of the autonomous drone to output a sensed signal, the main controller outputs a main control sensed signal according to the sensed signal, and the flight control panel controls the drone body to fly according to the main control sensed signal.

* * * * *